Patented Mar. 4, 1952

2,588,290

UNITED STATES PATENT OFFICE 2,588,290

METHOD OF PREPARING STABLE EMULSIONS OF LIPOIDIC SUBSTANCES IN WATER

Engbert Harmen Reerink and Jacob Van der Vliet, Weesp, Netherlands, assignors, by mesne assignments, to Hartford National Bank and Trust Company, Hartford, Conn., as trustee No Drawing. Application February 15, 1946, Serial No. 648,018. In the Netherlands March 4, 1943

Section 1, Public Law 690, August 8, 1946
Patent expires March 4, 1963

6 Claims. (Cl. 99—11)

It has been proposed to prepare emulsions in water of fish oil containing vitamins A and D or of a codliver oil concentrate dissolved in oil with the use of tragacanth, gum-arabic or the like as an emulsifying agent.

It has also been proposed intimately to mix oil containing vitamin with inspissated milk, cream or milk powder and to introduce a vitamin preparation obtained in this manner into milk for preparing vitaminized milk, the inspissated milk, the cream or the milk powder having an emulsifying action.

In addition, it has been described to prepare an emulsion in water of oil containing vitamin A with the use of cholestenone-3-sulphonic-acid-6 as a substance assisting in emulsifying.

According to the invention, an emulsion, in water or an aqueous medium, of fat-soluble vitamins, provitamins, or vitamin and provitamin concentrates is prepared with the use of an emulsifying agent constituted by a steroid having an aliphatic side-chain at least 4 carbon atoms in length at the carbon atom 17, said steroid having introduced into it one or more hydrophile groups by esterifying or alkoxylating a hydroxyl group by means of suitable compounds. Suitable compounds are those yielding an emulsifying agent not insoluble in water; excessive solubility in water, such as possessed for example by cholestenone 3-sulphonic acid-6, should preferably be avoided the emulsifying action being detrimentally affected thereby.

When preparing an emulsion according to the invention the properties of the substances that are present in the emulsion in addition to the substance to be emulsified and the emulsifying agent or that will be present in the use of the emulsion should be taken into account in choosing an emulsifying agent, because detrimental interactions may occur between the substances referred to and the emulsifying agent.

An emulsifying agent according to the invention has the advantage of being very closely related to compounds contained in the human body, so that in the use of an emulsion according to the invention for vitaminizing foodstuffs such as milk these foodstuffs do not contain any substances foreign to the body. An additional advantage is that only minute quantities of the emulsifying agents according to the invention are required; frequently even 5% of the quantity of the substance to be emulsified suffices and there is never any need to use more than identical quantities. A further advantage is that the invention permits of preparing highly concentrated, stable emulsions with such a low amount of an emulsifying agent, even if vitamins or provitamins or concentrates thereof by themselves, undissolved in oil or containing but little oil have to be emulsified so that it is impossible for the oil to be used as the carrier of the substance to be emulsified.

Concentrated emulsions of this kind are particularly useful for vitaminizing milk, because they permit of ready emulsions for vitaminizing milk, that are capable of being agitated directly through the milk to be treated, being distributed from a central point without the cost of carriage becoming prohibitive.

Central preparation of a vitaminizing emulsion to be mixed through milk has inter alia the advantage over separate treatments at the points of milk production that only a single emulsifying plant is required and in addition that the preparation of the emulsion can be left to those skilled in the art.

When treating emulsions according to the invention, it is possible to obtain a very fine degree of division and this is an important advantage in connection with the possibility of diluting the emulsion. Tests undertaken in this direction revealed that when vitaminizing milk by means of a vitamin solution in oil to be evenly distributed through the milk, even in the case of comparatively low vitamin concentrations (exceeding about 20,000 international units/gram) the emulsion is even too coarsely dispersed to be capable of being evenly diluted up to the concentration necessary for the animal test with the result that the required checking is materially hampered. The method according to the invention permits of obtaining emulsions having a strength of for example 500,000 I. U. vitamin $D_3$ per gram of emulsion and being capable of being quite evenly diluted.

An advantage of the emulsions obtained in accordance with the invention over preparations obtained by mixing vitamin oils with milk powder and so forth is that they are much less perishable.

According to the invention, it is possible to secure such stable emulsions that milk vitaminized thereby can be pasteurized and boiled without difficulty and due to the minute particle-size the probability that during the so-called "creaming up" all of the vitamins in the film of cream will be separated is very low.

A simple experiment permits of ascertaining whether an emulsifying agent according to the invention is suited for preparing an emulsion that is desired to be mixed with milk. For this purpose, about 10 mgs. of the emulsifying agent are dissolved in 1 ccm. of distilled water having added to it a few drops of ethanol, then 0.3 ccm. of a newly treated, evenly distributed and centrifuged solution of 10 grams of skimmed milk powder in 25 ccm. of distilled water are added, mixing is effected and the liquid is judged of after several hours. For the purpose of checking, a similar experiment without any emulsifying agent is also undertaken. If on judgment the appearance of the trial solution is found to be similar to that of the checking solution the emulsifying agent is serviceable for its proposed use; it is unserviceable for this purpose when a flocculent separation occurs to a more or less extent.

In carrying out this test, it was found for example that the tri-sodium salt of the butane-1,2,3,4-tetra-carbonic mono-cholesteryl ester, the sodium salt of the acetyl-citric monocholesteryl ester and the sodium salt of the succinic monocholesteryl ester didn't yield any visible change with milk.

In agreement therewith, emulsions treated with the aid of the said substances as an emulsifying agent could be diluted with milk while conserving their good properties.

In contradistinction to this, it was found that for example when carrying out the test on (carbo-cholester-oxy)-methyl-triethyl-ammonium chloride a precipitate occurred which can be accounted for by the action of the cations of this substance on the negatively charged milk protein.

On carrying out the test on the potassium salt of the cyclohexene-4-dicarbonic-1.2-monocholesteryl ester, the glycerol-phosphoric monocholesteryl ester and the sodium salt of the latter, a flocculent separation was produced at once; with the sodium salt of the phthalic monocholesteryl ester and the sodium salt of the phthalic monoester of a sterol-mixture from the unsaponifiable part of the fat of the mussel (*Mytilus edulis*) a good visible flocculent separation was not formed until after several hours.

In agreement with this experiment, vitamin emulsions prepared by means of these substances as the emulsifying agent, although these emulsions were quite suited per se for example for the uniform distribution of vitamin in solid substances or for direct use, could not be mixed with milk without any change.

In addition, the method is particularly useful for preparing preparations of fat-soluble vitamins suitable for injection. The injection of a vitamin solution in oil is known to be beset with difficulty so that the use of this method is but little propagated in therapeutics. Particularly for the so-called pulsation therapeutics there is, however, a great need for a painless preparation of high concentration that can be readily manipulated. The results obtained by tests on animals revealed that emulsions according to the invention, for example, comprising tri-sodium salts of butane-1,2,3,4-tetracarbonic esters of sterols are highly suited for this purpose.

Several sterol esters and ethers have been described to be possessed of emulsifying capacity. Their particular suitability for emulsifying vitamin preparations was, however, not known hitherto. Especially, the particular suitability of part of these substances, to be chosen by a simple experiment, for treating emulsions capable of being mixed with milk was not known.

*Examples*

I. A solution of 8 grams of crude irradiation product containing 50 millions of I. U. vitamin $D_3$ in 100 ccm. of ethanol was dripped in a nitrogen atmosphere, while agitating, into a solution heated to 60° C. of 400 mgrs. of tri-sodium salt of butane-1,2,3,4-tetracarbonic monocholesterol ester in 100 ccm. of distilled water free from air. After distilling the ethanol and concentrating in vacuo a stable aqueous emulsion containing 550,000 I. U. vitamin $D_3$ per ccm. was obtained. Tests on animals revealed that the emulsion could be diluted with any amount of milk without the dispersity suffering therefrom.

II. A solution of 0.5 gram of (carbo-cholesteroxy-)-methyl-triethyl ammonium chloride in 3 ccm. of ethanol was diluted with 18 ccm. of distilled water. 2 grams of a solution of vitamine $D_2$ in arachis oil having a strength of 3 millions of I. U. vitamine D per gram were dissolved in 10 ccm. of ether and this solution was emulsified by shuffling in the first-mentioned aqueous solution. After distilling ether and ethanol at a reduced pressure a stable emulsion containing 400 I. U. vitamine $D_2$ per ccm. was obtained.

III. A solution of 0.5 ergosterol in 100 ccm. of ethanol was dripped, while agitating, into a solution of the sodium salt of 500 mgs. of phthalic monocholesteryl ester in 800 ccm. of distilled water free from air which was heated to 60° C. After the ethanol was distilled at a reduced pressure, 0.5 gram of ergosterol in 100 ccm. of ethanol was again added in the same manner. By concentrating in vacuo up to a volume of 17 ccm., a stable emulsion containing 5.9% of ergosterol was obtained.

IV. 2 grams of a carotene concentrate containing 69 mgrs. of carotene were dissolved in 100 ccm. of acetone and this solution was dripped, while agitating, into a solution heated to 60° of 200 mgs. of tri-sodium salt of butane-1,2,3,4-tetracarbonic monocholesteryl ester in 400 ccm. of boiled-out distilled water. The emulsion obtained was concentrated in vacuo while nitrogen was being passed through it and could be thickened by evaporation in this manner to a volume of 25 ccm. while conserving its dispersity.

What we claim is:

1. A method of preparing thinly liquid stable emulsions of lipoidic substances, particularly fat soluble vitamins, in an aqueous medium comprising the step of adding the lipoidic substance to a solution of an emulsifying agent soluble in water and consisting of esterified cholesterol having the following constitution:

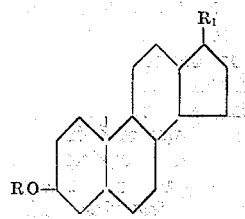

in which R is an organic group having at least one free carboxyl group and at least one hydrophile group and $R_1$ is an aliphatic side-chain at least four carbon atoms in length, to form an emulsion of said fatty substance which is stable in an aqueous medium.

2. A method of adding fat-soluble vitamins to fluid milk comprising the steps of adding the fat-soluble vitamin to a solution of esterified cholesterol having the following constitution:

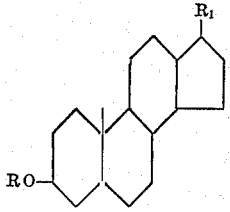

in which R is an organic group having at least one free carboxyl group and at least one hydrophile group and $R_1$ is an aliphatic side-chain at least four carbon atoms in length, to form an emulsion of said vitamin, and adding said vitamin emulsion to fluid milk.

3. A method of adding vitamin $D_3$ to milk as claimed in claim 2 wherein the R group of the emulsifying agent is:

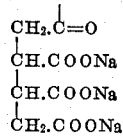

4. A method of preparing a stable emulsion of vitamin $D_2$ in an aqueous solution as claimed in claim 1 in which R is:

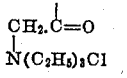

5. A method of preparing a stable emulsion of ergosterol in an aqueous solution as claimed in claim 1 in which R is:

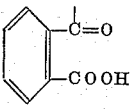

6. A method of preparing a stable emulsion of vitamin A in an aqueous solution as claimed in claim 1 in which R is:

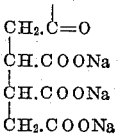

ENGBERT HARMEN REERINK.
JACOB VAN DER VLIET.

REFERENCES CITED

The following references are of record in the file of this patent:

UNITED STATES PATENTS

| Number | Name | Date |
|---|---|---|
| 1,220,010 | Schlink | Mar. 20, 1917 |
| 1,896,185 | Nolan | Feb. 7, 1933 |
| 2,150,649 | Ellis | Mar. 14, 1939 |
| 2,205,925 | Hickman | June 25, 1940 |